United States Patent [19]

Chang et al.

[11] Patent Number: 5,323,388
[45] Date of Patent: * Jun. 21, 1994

[54] LOCAL AREA NETWORK TRANSMISSION EMULATOR

[75] Inventors: Eugene Y. Chang, Cambridge; David B. Richardson, Bellingham; Bennett C. Baker, Dedham, all of Mass.

[73] Assignee: Extension Technology Corp., Framingham, Mass.

[*] Notice: The portion of the term of this patent subsequent to Jan. 18, 2011 has been disclaimed.

[21] Appl. No.: 97,851

[22] Filed: Jul. 27, 1993

Related U.S. Application Data

[63] Continuation of Ser. No. 763,340, Sep. 20, 1991, Pat. No. 5,280,481.

[51] Int. Cl.$^5$ .................. H04L 12/56; H04L 12/52; H04L 12/66
[52] U.S. Cl. .................................. 370/60; 370/94.1; 370/85.13
[58] Field of Search .............. 370/60, 60.1, 58.1, 370/58.2, 58.3, 94.1, 94.2, 85.13, 85.14

[56] References Cited

U.S. PATENT DOCUMENTS

| | | | |
|---|---|---|---|
| 4,787,082 | 11/1988 | Delaney et al. | 370/85 |
| 4,818,984 | 4/1989 | Chang et al. | 340/825.54 |
| 4,868,866 | 9/1989 | Williams, Jr. | 380/49 |
| 4,926,420 | 5/1990 | Shimizu | 370/94.1 |
| 4,930,123 | 5/1990 | Shimizu | 370/94.1 |
| 5,093,827 | 3/1992 | Franklin et al. | 370/60.1 |

FOREIGN PATENT DOCUMENTS 0302646  2/1989  European Pat. Off. ..... H04L 11/16

OTHER PUBLICATIONS

IBM Technical Disclosure Bulletin, Short Hold Mode in ISDN, vol. 32, No. 10A, Mar. 1990, pp. 47–49.
IEEE Std 802-1990 IEEE Standards for Local and Metropolitan Area Networks: Overview and Architecture (excerpt) (Dec. 31, 1990).
U.S. Government Open Systems Interconnection Profile (GOSIP), Version 2.0, Oct., 1990.
Haugdahl, J. Scott, Architecture Technology Corp., Inside NETBIOS, 2nd Ed.
Leifer, Dory, Draft Internet RFC, University of Michigan.
Digital ISDN Connectivity, LAN Bridges and Gateways (1990).
Wellfleet Communications, Inc. Router/Bridge PRI, LANs, Bridges, Gateways and Routers (1991).
Network Express, Inc. ISDN PRI Bridging, LANs, Bridges, Gateways and Routers (1991).
The Software Link Networking with PC-MOS, ISDN LAN (1990).
Interactive Systems ISDN LAN Bridging, LAN Bridgesand Gateways (1990).
PROMPTUS T-1 CommServer+Flexible Bridge/-Router+Multiplexer.
EXCELLTECH INC. ISDN and ExcellNET.
Lanworks ISDN Router for NetWare (Mar., 1991).
Intercomputer Communications Corporation (ICC) RIN Product Overview.
Teles Solidifies PC Terminal Adapter Leadership: 1–7.
IBM Product Announcement; IBM ISDN Interface Co-Processor/2 Model 2: 1–3 (Jan., 1991).
3Com NETBuilder Bridge/Routers (1991).
ICL/ISDN Upgrade Package for Personal Computers.
OST ISDN Communications for Personal Computer PC SNET CARD Product Overview.

(List continued on next page.)

*Primary Examiner*—Wellington Chin
*Attorney, Agent, or Firm*—Testa, Hurwitz & Thibeault

[57] ABSTRACT

A method and apparatus for using switched telecommunications services to emulate a local area network (LAN) medium. The method and apparatus convert a public switched network or an equivalent private network into a LAN cabling method for connecting distant devices using the same communications software as used in traditionally wired LANs.

17 Claims, 4 Drawing Sheets

OTHER PUBLICATIONS

Fujitsu ISDN INSIGHTS; Fujitsu Demonstrates ISDN LAN to LAN and WAN to LAN Connectivity.

DigiBoard Product Profile; DigiBoard ISDN NetLink.

National Institute of Standards and Technology, North American ISDN Users Forum, Application Software Interface Expert Working Group, Proposed Standard (Sep., 1991).

Northern Telecom, ISDN PC Card NetBIOS Interface (Apr., 1988).

IBM, ISDN PC Card, ISDNBIOS Programmers Guide (1991).

AT&T ISDN PC Card Programming Interface (1989).

Hayes Microcomputer Products, Inc. ISDN PC Card, ISDNBIOS Interface (Apr., 1991).

ICL, ISDN PC Card Application Program Interface.

OST, PC SNET Card Programmers Manual.

Teleos Communications, Applications Interface User's Guide (1990).

DigiBoard ISDN NetLink, ISDN NetBIOS LAN (1990).

DigiBoard, NetLINK Technical Reference (Nov., 1990).

LOCAL AREA NETWORK TRANSMISSION EMULATOR

CROSS-REFERENCE TO RELATED APPLICATION

This is a continuation of U.S. patent application Ser. No. 07/763,340, filed Sep. 20, 1991, now U.S. Pat. No. 5,280,481.

FIELD OF THE INVENTION

This invention relates to a method and apparatus for using switched telecommunications services to emulate a local area network (LAN) medium.

BACKGROUND

Local Area Networks (LANs) provide a method for connecting computers or other devices together to exchange data or to harness groups of computers together to apply their combined power to a single problem. Generally speaking, a LAN includes: 1) a high speed transmission medium, typically metallic or fiber optic, for connecting each of the devices to the LAN; 2) the ability to transmit a message on the transmission medium directed to a single device; and 3) a means known as "broadcast" in which all devices connected to the LAN medium can receive a message transmitted on the medium. A standard for the implementation of LAN devices and systems has been established by the Institute of Electrical and Electronic Engineers as IEEE Standard 802.

The physical length of the transmission medium and the total number of devices connected thereto are typically limited on a LAN due to the physics of high speed transmission systems. Bridges and routers are devices used to connect multiple LANs to provide communications between individual LANs and to construct large networks that transcend the technical size limits of a single individual LAN. When the individual LANs to be interconnected are at geographically remote locations, bridges and routers are used in pairs, one at each site, to provide a path for data to flow from one LAN to another, with a lower speed communication link between the bridge or router pair. Typically the data rates of the long distance communications link is a fraction of the data rate of the LAN medium. The use of bridges and routers has been limited, however, due to the cost of these devices and the costs of the long distance communications link.

An all-digital telephone network, known as the Integrated Services Digital Network ("ISDN"), has become a potential substitute for the private long distance lines currently used by bridges and routers. ISDN provides relatively high speed digital transmission service on an "as needed" basis, and is different from LAN transmission media in that it is a switched transmission media which provides a point-to-point transmission service on an intermittent basis.

Modern communications technology can be analyzed with respect to the Open Systems Interconnect (OSI) Reference Model. The OSI model decomposes a communication system into seven major components or layers which are defined by international standards. The OSI model is concerned with the interconnection between systems, i.e., the way they exchange information, and not with the internal functions that are performed by a given system. The OSI model depicted in FIG. 1 provides a generalized view of a layered architecture, using an approach where sets of functions have been allocated to different layers.

The first layer is known as the physical layer and is responsible for the transmission of bit streams across a particular physical transmission medium. This layer involves a connection between two machines that allows electrical signals to be exchanged between them.

The second layer is the data link layer, and is responsible for providing reliable data transmission from one node to another and for shielding higher layers from any concerns about the physical transmission medium. It is concerned with the error-free transmission of frames of data.

The third layer, the network layer, is concerned with routing data from one network node to another and is responsible for establishing, maintaining, and terminating the network connection between two users and for transferring data along that connection. There can be only one network connection between two given users, although there can be many possible routes from which to choose when the particular connection is established.

The fourth layer is the transport layer, and is responsible for providing data transfer between two users at an agreed on level of quality. When a connection is established between two users, the transport layer is responsible for selecting a particular class of service to be used, for monitoring transmissions to ensure the appropriate service quality is maintained, and for notifying the users if it is not.

The fifth layer i the session layer, and it focuses on providing services used to organize and synchronize the dialog that takes place between users and to manage the data exchange. A primary concern of the session layer is controlling when users can send and receive, based on whether they can send and receive concurrently or alternately.

The sixth layer is the presentation layer, and is responsible for the presentation of information in a way that is meaningful to network users. This may include character code translation, data conversion or data compression and expansion.

The seventh layer is the application layer, and it provides a means for application processes to access the system interconnection facilities in order to exchange information. This includes services used to establish and terminate the connections between users and to monitor and manage the systems being interconnected and the various resources they employ.

Different components (or implementations) that conform to a common standard are considered equivalent and interchangeable. A system constructed from components that conform to their respective standard is expected to interoperate (i.e., to be able to communicate) with any other system constructed out of a different set of components that conform to the standards. Communications between systems are organized into information that is exchanged between entities at each layer.

A layer in the OSI model provides specific services to an upper layer through service access points ("SAPs"). Take, for example, the situation where Systems A and B are joined by a transmission medium at layer 1. Information from layer x of system A is constrained to communicate with layer x of system B. The information of layer x of system A is transported, however, by requesting service from layer x-1 of system A for delivery to layer x of system B. The mechanism for communication between two systems at a single layer is referred to as a protocol (i.e., "a layer x protocol"), and a protocol stack is a set of protocols for layers 1 to x. The OSI protocols provide flexibility in usage by incorporating optional features and user determined parameters. Profiles are standards that specify the selection of options and parameters to ensure compatibility between two compliant systems. Profiles are needed since two compliant systems using different profiles may still not be able to exchange data.

In FIG. 1, layer 1 represents the network or transmission medium, and includes token rings, token buses, and interfaces such as RS-232, RS-530 and V.35. Layer 2, the data link layer, has as its primary responsibility the transfer of frames of information between physically linked devices. When only two devices are connected by the network layer medium, the data link layer assumes that the network layer will provide the mechanism of addressing messages to the proper device.

IEEE Standard 802.2 provides a model which divides the data link layer 2 into two sublayers: an upper sublayer for Logical Link Control (LLC) and a lower sublayer for Media Access Control The IEEE 802.2 model differs from earlier data link layers of the OSI Reference Model by providing a method for addressing messages to specific destinations. This is required since more than two devices are connected by the medium at layer 1.

This mechanism is necessary in the context of a single isolated LAN (or LAN segment) without connections to other LANs (or LAN segments) because many devices are connected to a common transmission medium and a means for directing a message to a single destination is important.

The MAC sublayer regulates station access to the transmission medium that is shared by multiple stations on the LAN. For a given LAN, the MAC sublayer governs a common transmission medium that has one pathway or route between communicating network stations. In the context of the IEEE 802.2 model, the network station address is referred to as the MAC address and is sufficient for ensuring delivery of a MAC frame to a destination address on the LAN. The MAC sublayer offers services consistent with those in the OSI data link layer.

The LLC sublayer mediates multiple logical connections for upper layer service users. As a service provider, the LLC sublayer offers several Service Access Points (SAP) as logical ports for multiple upper layer entities located at a given network station address. As a service user, the LLC sublayer issues requests through the SAP provided by the MAC sublayer. The LLC sublayer Service Access Points are typically shown situated between layer 3 (network) and layer 2 (data link) of the OSI Reference Model.

A significant number of layer 3 protocols bypass the LLC Service Access Point and interface directly to the MAC Service Access Point.

SUMMARY OF THE INVENTION

The disclosed invention provides a method and apparatus for using the IEEE Standard 802 LLC or MAC service layer as an interface to communicate over the ISDN. The disclosed invention presents the ISDN as a LAN transmission media to upper layer (layer 3 and above) protocols, and permits communication systems designed to operate over LAN to operate over the ISDN. As a result, LAN devices can be dispersed geographically using inexpensive ISDN communications without the geographic limitations of a single LAN and without the cost of bridges, routers, and the associated communications links currently used to interconnect LAN segments.

FIG. 1 shows the relationship of the invention with respect to the OSI Reference Model. The generally accepted role of the ISDN in the communications industry or OSI Reference Model is shown as a stack occurring in layers 1 to 3 of FIG. 1 (bottom left). The ISDN has the role of a layer 3 service with service access points to layer 4 protocols. Use of the disclosed invention permits ISDN to be used as an alternative LAN medium, thus permitting existing computer systems and other communication devices designed to use LANs to be connected through t he ISDN without change of protocols from layer 3 on up. This allows access to the ISDN for a large body of systems and software without requiring modification.

The disclosed embodiment of the invention features a MAC layer interface, packet replication to emulate broadcasting on a common access medium, physical connection during periods with message traffic, physical disconnection during periods with no message traffic, classification of traffic patterns with re direction to circuit and packet switched channels that match the required capacity, a virtual channel interface that utilizes multiple physical channels to service one logical channel, a virtual physical interface that makes multiple physical interfaces appear as a single physical interface, and a method for providing connections to a number of users that exceed the number of physical channels.

BRIEF DESCRIPTION OF THE DRAWING

The present invention will be better understood hereinafter as a result of the detailed description of the invention when taken in conjunction with the following drawings in which.

DETAILED DESCRIPTION OF THE INVENTION

Three lasses of datagrams are typically submitted to a LAN medium: directed datagrams, multicast datagrams and all stations broadcast datagrams. The LAN emulator manages LAN datagram traffic by a set of logical channels between every pair of nodes that exchanges datagrams. The actual transmission of datagrams between nodes is provided by a physical channel. The LAN emulator only requires a physical channel between nodes when datagrams are actively being exchanged over a logical channel (between two nodes).

Since the hardware interface to the public network (e.g. ISDN) provides a limited number of physical channels, the LAN emulator provides a monolithic interface to the higher layer protocol process. That process interacts with a single entity, the LAN emulator, while the total transmission service may be provided by more than one hardware interface to the public network.

All types of datagrams (directed, multicast, and broadcast) intended for transmission are potentially subject to one or more filtering mechanisms. A filter can either leave the datagram unchanged or remove the datagram from any further transmit processing. Datagrams that remain unchanged are termed ordinary or unfiltered datagrams, while datagrams that are removed by a filter are termed filtered datagrams. Each filter typically acts on a specific class or type of datagram.

One generic filtering mechanism used in the invention is termed rate suppression. Rate suppression acts on certain types of datagrams which contain repetitive information, and functions by passing only a certain percentage or ratio of those datagrams it recognizes. The purpose of rate suppression filtering is to minimize transmission charges for those datagrams whose content does not change or changes very slowly over time.

Another generic filtering mechanism used in the invention is termed response spoofing. Response spoofing acts on those packets which contain repetitive information, but which require a response from the destination or destinations. The response spoofing filter not only removes these datagrams from further transmission processing, but also simulates the response that would be expected from the destination(s), and delivers the spoofed response to the higher layer protocol processes.

Figure 1:
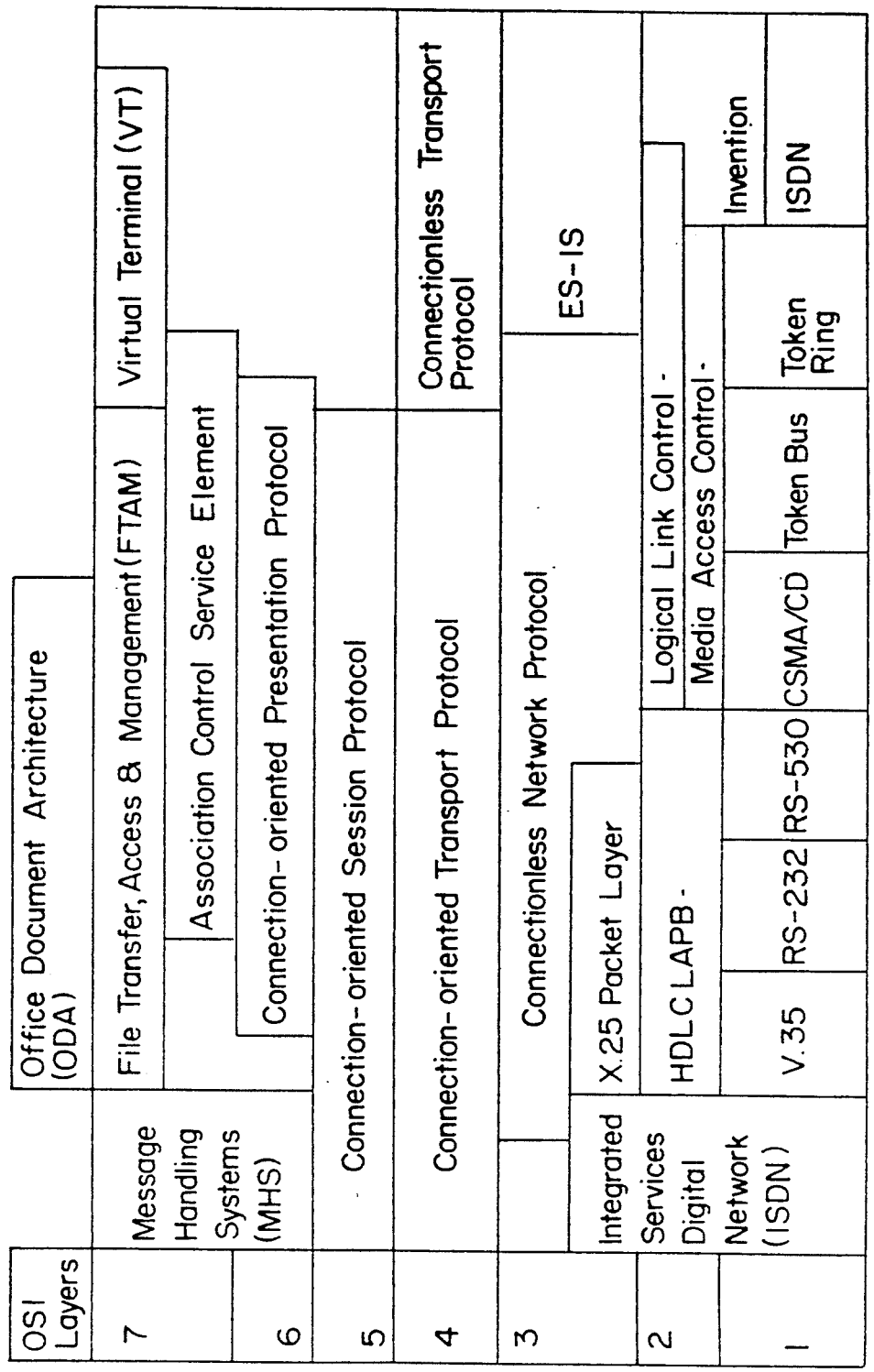
FIG. 1 diagrammatically depicts the OSI Reference Model and its relation to the invention.
Figure 2:
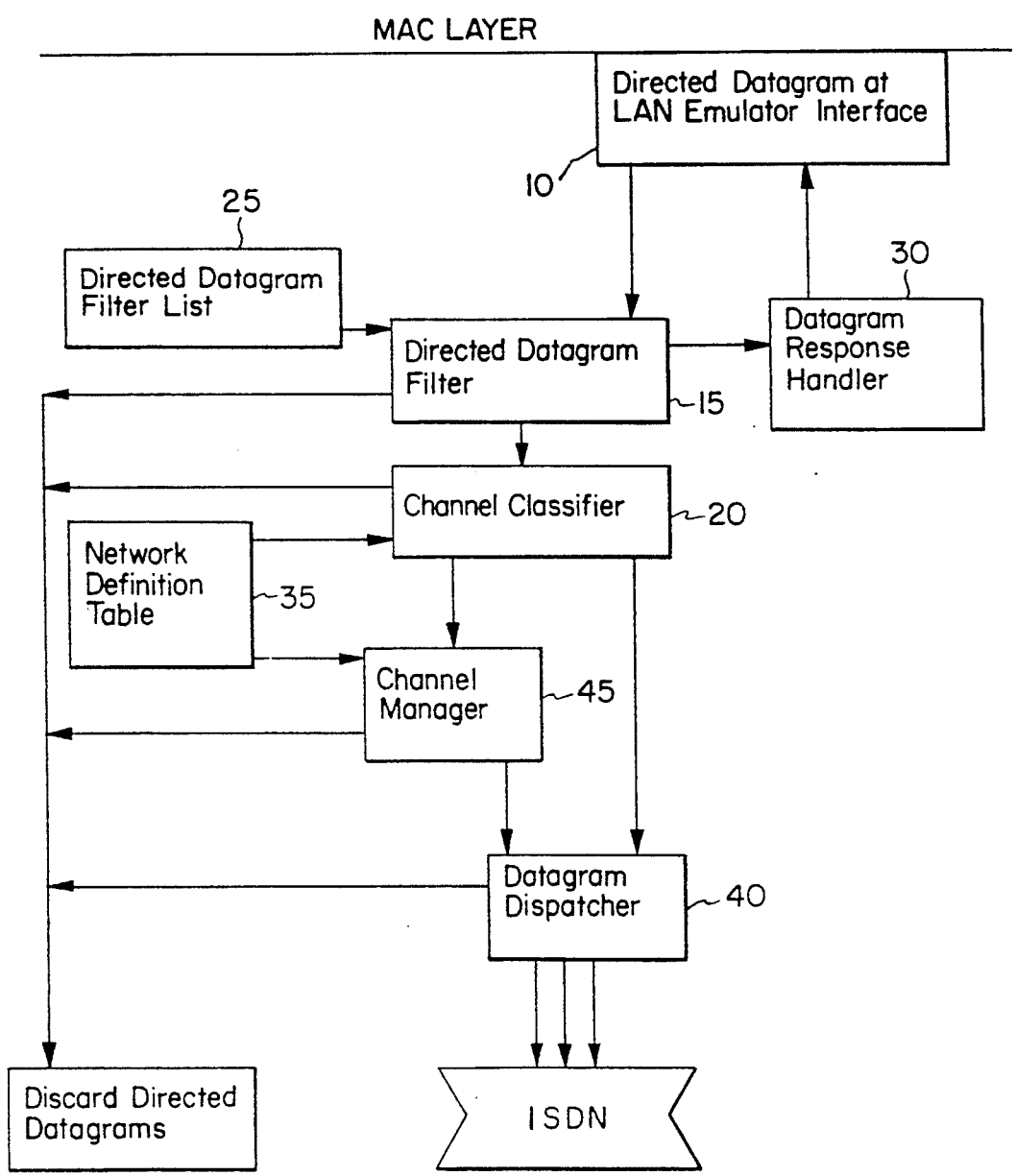
FIG. 2 is a block diagram of an embodiment of the invention for conveying a directed datagram.

With reference to FIG. 2, an embodiment of the invention for conveying a directed datagram with a specific destination address through the LAN Emulator interface to emulate the transmission of a directed datagram on a LAN is described.

As mentioned above, a protocol stack is a set of protocols for the various layers. With the disclosed embodiment, and with reference to FIG. 2, a high layer protocol process submits a directed datagram to the LAN Emulator interface 10 accompanied by the appropriate LAN MAC layer source and destination addresses. For every device there is at least one LAN MAC address and a corresponding switched network address.

This disclosed embodiment describes a direct interface from higher layers to the MAC interface, as is commonly found in systems implemented for personal computers. An LLC interface may be required in some systems. The difference between an LLC interface and a MAC interface is not significant with respect to the disclosed invention.

A directed datagram filter 15 makes a determination of the datagram type by comparing the datagram type with the contents of a directed datagram filter list 25. This is a list of protocol specific datagrams specific to the application system. When there is a matching datagram type in the directed datagram filter list 25, the datagram is marked as one which may be discarded from the transmission queue or enqueued for a spoofed response at a later time. The marking is based upon the actions specified within the directed datagram filter list 25.

The datagram is then passed to a channel classifier 20 for further qualification. However, datagrams marked for removal from the transmission queue are not given to the channel classifier 20 and so are not sent to any destination node. Instead, they are either discarded or sent to the datagram response handler 30, where a spoofed response is formatted and eventually delivered to the higher layer protocol process.

The channel classifier 20 receives unfiltered directed datagrams from the directed datagram filter 15. Using the LAN MAC address as a search key, the classifier 20 retrieves a switched network address and an associated node channel status from a network definition table 35.

The network definition table 35 has an entry for each node on the emulated LAN. A node may have multiple entries with different LAN MAC addresses. Each entry includes, but is not limited to: the LAN MAC address, which is the node LAN address the device would have if it was connected to a conventional LAN; the switched network address, which is the address of the device on the switched network (e.g., for devices using ISDN, the public network number on the public switched telephone network); the node type, which is a descriptor which describes the node type or function; suspension timer values, which are the parameters that control the suspension of the network connection; preferred service parameters, which specify the preferred types of transmission service when a connection is created; node channel status parameter, which reflects the operational status of a remote node; and broadcast service selectors, which are parameters that specify the methods by which broadcast messages are distributed to remote nodes.

One class of preference is the type of service. The effective bandwidth delivered is determined by the preferred service parameter of the network definition table. The channel classifier can decide whether to transmit low priority information on low bandwidth channels, such as the D-channel packet switched service of ISDN. Devices connected to an ISDN may select, among others, a B-channel circuit switched service, B-channel packet switched service, D-channel packet switched service, or H0 circuit switched service.

Another class of preference is the minimum and maximum throughput desired. With the disclosed invention, multiple instances of a physical interface may be used under a single service layer. The upper layer protocols can therefore be presented with a single logical service layer while the actual transmission service may be delivered by more than one physical interface. It i possible to synthesize higher speed transmission service by combining multiple physical interfaces under a single service interface. Thus a device that requires higher speed transmission may specify the minimum and maximum number of transmission channels to be used when communication is established with a remote node. For purposes of description of the invention, the logical channel is the connection service delivered to the upper layers, and the physical channel is the means by which datagrams are delivered.

The datagram is discarded by channel classifier 20 when there is no entry in the table 35 that has the destination LAN MAC address. For LAN MAC addresses that are in the network definition table 35, the four possible values for node channel status are: registered with a logical channel and assigned physical channel(s), registered with a logical channel and no physical channels, registered, or not registered.

Where the node channel status for a case is registered node with datagram traffic on both a logical channel and its physical channels, it is considered a connection that is completely active. An unfiltered datagram is immediately submitted to the datagram dispatcher 40.

For an unfiltered datagram where the node channel status is registered node with datagram traffic on the logical channel but with no associated physical channel, there is an attempt to establish a connection to the destination node on a new physical channel. This is accomplished by giving the datagram to channel manager 45 which attempts to establish a connection on a physical channel and then to send the datagram over that connection. The channel manager 45 manages the process of establishing a connection through both a logical and new physical channel.

Node registration is a MAC management function that occurs at the time the LAN Emulator is initialized. When a node is registered with another node it means that it will respond to a request for connection. It also means that another node may attempt a connection with it. There is no implication that the connection attempt will be successful; a connection attempt may fail because the node's circuit resources may be occupied at the time of the attempt.

Node de-registration occurs when the LAN Emulator is shut down. This involves the LAN emulator sending de-registration messages to its connection partners. De-registration is not mandatory. A node may also be de-registered when an attempt to connect to it fails because that node is no longer active.

Datagrams addressed to a node which is not registered are discarded by the channel classifier 20.

As mentioned above, the channel manager 45 is responsible for initiating a connection on a logical and/or a physical channel. If there is a request for connection on a pre-existing logical channel, the channel manager 45 establishes connections on the requisite physical channel(s). For a connection request when no logical channel exists, the channel manager 45 will set up a new logical channel as well as new physical channels.

A logical channel may be supported by more than one connection to the same destination through multiple physical channels. The channel manager 45 uses a user preference contained within the network definition table 35 to determine the number of physical channel resources to allocate for a given connection attempt to the destination node.

There are three possible occurrences when there is an attempt to allocate a physical channel on behalf of the logical channel. In the first, there are either no physical channels available for conveying the datagram or there is a network problem that prevents a call from being offered to the destination node. In the second, there are physical channels available, but when a call request is placed to the remote node at the destination switched network address, a rejected call response gets returned. In these two cases, the logical channel is optionally torn down and network definition table maintenance is performed.

The third possibility is that the call request is accepted by the node at the destination switched network address, at which point the connection is considered physically active.

When the node channel status field shows that no logical or physical channel exists, there is a choice for an appropriate course of action which is dependent upon whether a connection on a physical channel is possible, and which requires a destination node to have registered its LAN MAC address and to be able to accept a connection request. In this case, a logical channel and logical channel reference number are assigned after the physical channel is set up and a connection established.

The channel manager 45 will also monitor traffic on the physical channel, and during periods when there is no traffic, it may disconnect the physical channel while maintaining the logical channel. When new datagram traffic begins, the channel manager 45 will reassign a physical channel. During this process a physical channel is described as being suspended and later resumed. The channel manager 45 will monitor external events such as incoming calls and determine whether a logical channel will release its physical channel in order to reassign it to the new call. This may be termed release of bandwidth on demand.

One consequence of the invention's embodiment of suspend and resume is that the channel manager 45 may maintain more logical channels than the maximum number of physical channels possible. This is known as channel over-subscription. The channel manager 45 may associate an idle physical channel to a new logical channel while still maintaining the logical channel that had originally used the physical channel. As a consequence of over-subscription, there may be periods when there is more demand for active channels than there is supply of-preferred physical channels. In such cases the channel manager 45 will assign alternate (i.e., slower and/or more expensive) physical channels to carry the data. Over-subscription is also tied to the concept of a monolithic interface since the effectiveness of over-subscription is enhanced by the use of a larger number of physical channels.

The directed datagram dispatcher 40 receives a list of physical channels to which a datagram must be transmitted. It then manages datagram delivery by sending it through those individual channels. Usually there is only one element in the channel list. If multiple channels are listed and the packet size is sufficiently large, the datagram dispatcher 40 may fragment the datagram and send the marked fragments on different physical channels to the same logical destination.

Figure 3:
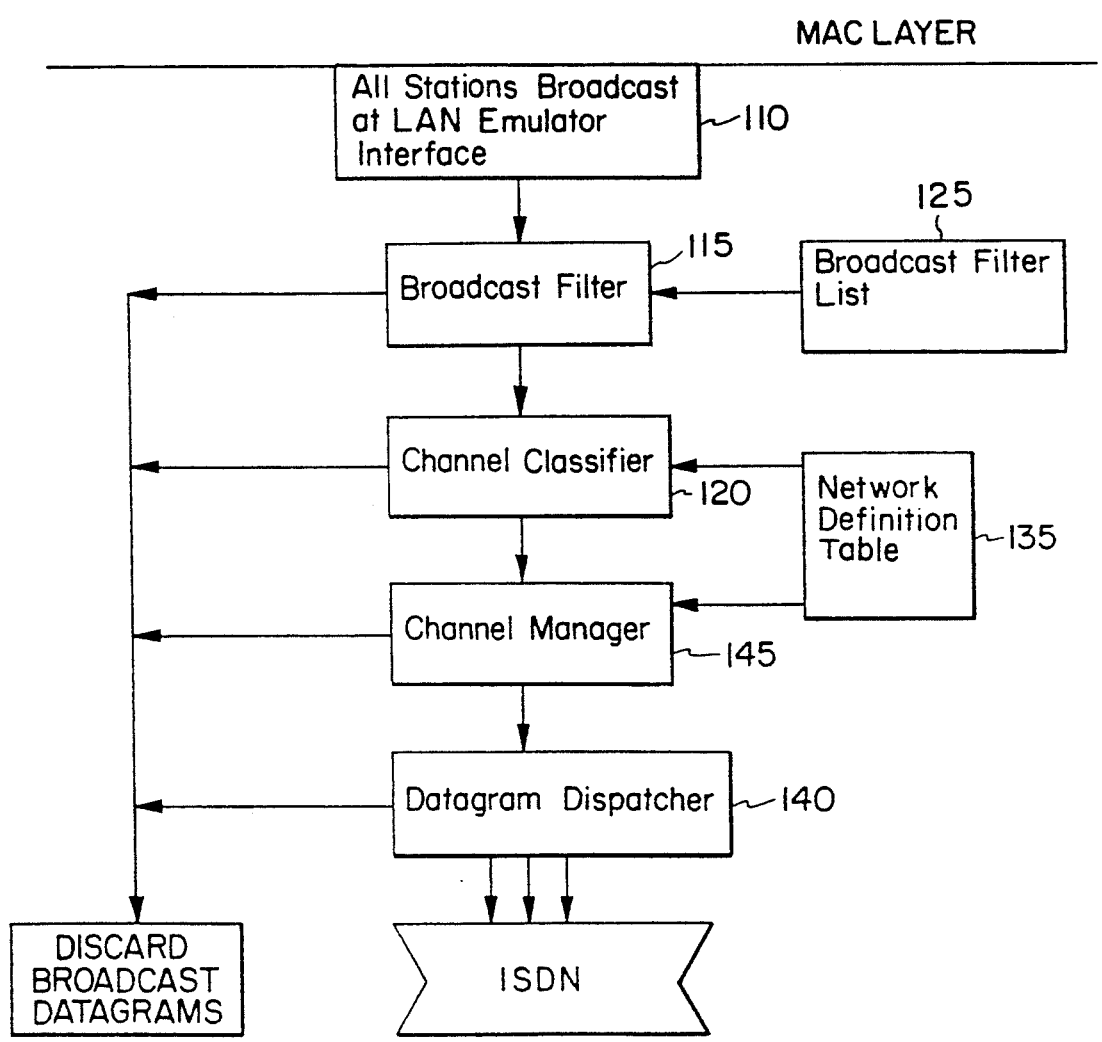
FIG. 3 is a block diagram of an embodiment of the invention for conveying a broadcast datagram.

With reference to FIG. 3, the mechanisms employed to convey an all stations broadcast datagram through the LAN Emulator interface to emulate a local area network are described. An all stations broadcast datagram has a LAN MAC destination address with a format that is a special case in that all bits are set to one in each of the address's octets. This transmission is emulated by sending the datagram to all eligible members of a finite list of recipients.

As with the emulation mechanism for the directed datagram, for an all stations broadcast, the higher layer protocol process submits a datagram to the LAN Emulator interface 110 with an all stations broadcast destination LAN MAC address. Because there are several uses for an all station broadcast datagram that are entirely application dependent, several selection mechanisms may be used for separating broadcast datagrams of different origin and directing them into appropriate courses of action. For example, some datagrams may be entirely blocked from transmission by filter 115, some may have a transmission frequency attenuated by the filter, and the filter may have no effect on the transmission frequency of others. The metric for these filters may be a function of either cost, throughput performance, propagation delay or some other factor.

The broadcast filter 115 compares the broadcast type against a broadcast filter list 125 to determine whether the broadcast datagram is a candidate for filtering or is an ordinary broadcast datagram. The filtering mechanism 115 affects the transmission frequency of broadcasts either by not transmitting any of the datagrams or by transmitting over time 1 of every n datagrams for each type submitted.

The broadcast filter list 125 either specifies a spoofing response or contains the parameters and metrics that specify the appropriate attenuation rate for each type of broadcast datagram. The value of this rate is zero for blocked broadcasts or is expressed as a ratio for reduced broadcast frequencies. The filtering mechanism 115 does not affect the transmission frequency of unfiltered broadcasts, which are automatically given to the channel classifier 120.

The channel classifier 120 receives all unfiltered broadcasts and some reduced frequency broadcasts and qualifies the broadcast eligibility for transmission. When the channel classifier 120 receives a broadcast datagram, it determines a list of destinations to which to send the broadcast and then passes that list to the channel manager 145 to handle delivery.

The channel classifier 120 will enqueue unfiltered broadcasts for delivery through all channels that are eligible for this service. This is regulated by the broadcast service parameter of the network definition table 135.

The functions of the channel classifier 120 may be accomplished by software, hardware, or through packet replication services provided by the network. There may be several reference criteria that are useful for deciding which destinations receive a particular broadcast datagram, and the network definition table 135 can hold values for these criteria including node type and node channel status.

The channel manager 145 receives information from the network definition table 135 to discriminate between those logical channels with active physical channels and those for which a physical channel must be first reestablished. For logical channels with active physical channels, the channel manager 145 submits the broadcast frame to the datagram dispatcher 140 with a request for transmission. The datagram dispatcher 140 receives a list of physical channels to which a broadcast must be transmitted and then manages broadcast delivery by sending the broadcast through the individual physical channels.

For logical channels without active physical channels, the channel manager 145 enqueues the broadcast datagram for delivery to those logical channels that can establish a new physical channel.

Figure 4:
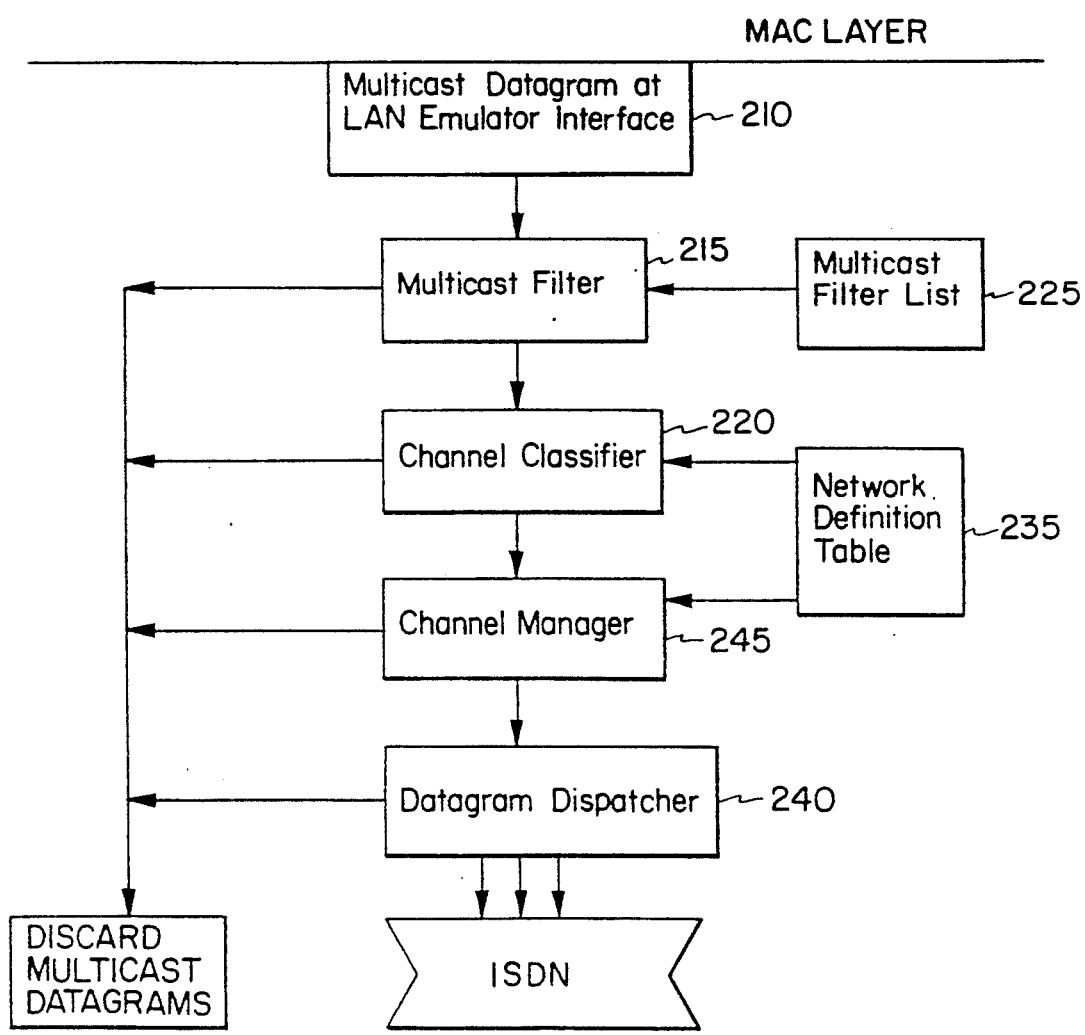
FIG. 4 is a block diagram of an embodiment of the invention for conveying a multicast datagram.

With reference to FIG. 4, the mechanisms employed to convey a multicast datagram through a LAN emulator interface to emulate a local area network are described. A multicast destination MAC address is represented by a '1' in the Individual/Group Bit (the LSB) and a '0' in the Universal/Local Administration Bit (the LSB+1) of the first octet, thus denoting a Group address within the universally administered address space. As with broadcasts, this class of transmission is emulated by sending the datagram to a list of recipients. The list may be same as the list maintained for the all stations broadcast datagram.

Again, as with the directed datagrams and broadcast datagrams, the higher layer protocol process submits a datagram with a multicast LAN MAC address to the LAN Emulator interface 210, which in turn submits it, after filtering in filter 215 based on information in the multicast filter list 225, to the channel classifier 220. When the channel classifier 220 receives a multicast that is enqueued for transmission, it uses the network table 235 to determine a list of destinations to which to send the multicast and passes that list to the channel manager 245 to handle delivery.

There are several reference criteria that may be useful for deciding which destinations receive a particular multicast datagram. The network definition table 235 holds values for these criteria which include node type, node channel status, and multicast filter lists.

Channel manager 245 examines the network definition table 235 to discriminate between those logical channels with active physical channels and those for which a physical channel must be first reestablished. For logical channels with active physical channels, the channel manager 245 submits the multicast frame to the datagram dispatcher 240 with a request for transmission. The datagram dispatcher 240 receives a list of channels to which a multicast must be transmitted. It then manages multicast delivery by sending it through the individual channels.

It should be apparent to one skilled in the art that the invention contains a message receive function which will perform complementary processing on received messages. All received directed datagrams, as well as broadcast and multicast datagrams, will be passed up to the higher layer protocol process.

It should also be readily apparent to one skilled in the art that the disclosed invention is not limited to any specific computer architecture or hardware device. For example, the disclosed embodiment works not only on IBM compatible personal computers with the Novell network operating system, but with other computer architectures as well, including IBM microchannel personnel computers, SUN SPARC workstations, Apple Macintosh computers, minicomputers and mainframes. In addition, although the embodiment disclosed herein simulates LANs over ISDN, the invention is applicable to other switched networks such as pre ISDN switched digital networks, X.25 networks, and frame relay networks.

Although it may be preferred to implement the described procedures using software, they can also be implemented using well-known hardware elements. Similarly, the disclosed invention can be applied to other communication devices which use LAN interfaces, including LAN bridges and routers.

Although an embodiment of the invention has been illustrated and described, it is anticipated that various changes and modifications will be apparent to those skilled in the art, and that such changes may be made without departing from the scope of the invention as defined by the following claims:

What is claimed is:

1. Apparatus for coupling a source device to a destination device, comprising:
    means for receiving, from a logical link control or medium access control service layer, a datagram having a source address identifying a source device and a destination address identifying a destination device;
    means for retrieving from a storage location an address on a switched network which corresponds to the destination address;
    means for using the switched network address to obtain access to a channel of the switched network; and
    means for providing the datagram to the channel of the switched network for transmission to the destination device.

2. The apparatus of claim 1 wherein the switched network comprises a switched telecommunications service.

3. The apparatus of claim 1 wherein the channel of the switched network comprises a physical channel.

4. The apparatus of claim 3 wherein the physical channel comprises multiple circuit or packet switched channels.

5. The apparatus of claim 4 wherein a logical channel receives the datagram.

6. The apparatus of claim 5 further comprising means for selectively mapping the multiple circuit or packet switched channels into the logical channel.

7. The apparatus of claim 5 wherein the physical channel is disconnected while the logical channel receives the datagram.

8. The apparatus of claim 4 further comprising means for de-establishing and re-establishing access to the physical channel when data traffic patterns over the switched network demand the services of a particular circuit or packet switched channel that is unavailable.

9. The apparatus of claim 1 wherein the source device and the destination device are computer network devices designed to communicate over one or more computer networks.

10. The apparatus of claim 1 wherein the storage location comprises a network definition table which includes one or more entries which identify devices on the switched network.

11. Apparatus for allowing communication between two computer network devices via a switched network, comprising:
    means for receiving, from a logical link control or medium access control service layer, a datagram having a source address identifying a source device and a destination address identifying a destination device, the source device and the destination device being designed to communicate over one or more computer networks;
    means for retrieving from a storage location an address on a switched network which corresponds to the destination address;
    means for using the switched network address to obtain access to a channel of the switched network; and
    means for providing the datagram to the channel of the switched network for transmission to the destination device.

12. The apparatus of claim 11 wherein the switched network comprises a switched telecommunications service.

13. The apparatus of claim 11 wherein the storage location comprises a network definition table which includes one or more entries which identify devices on the switched network.

14. A method for coupling a source device to a destination device, comprising:
    receiving, from a logical link control or medium access control service layer, a datagram having a source address identifying a source device and a destination address identifying a destination device;
    retrieving from a storage location an address on a switched network which corresponds to the destination address;
    using the switched network address to obtain access to a channel of the switched network; and
    providing the datagram to the channel of the switched network for transmission to the destination device.

15. The method of claim 14 wherein the switched network comprises a switched telecommunications service.

16. The method of claim 14 wherein the source device and the destination device are computer network devices designed to communicate over one or more computer networks.

17. The method of claim 14 wherein the storage location comprises a network definition table which includes one or more entries which identify devices on the switched network.

* * * * *